United States Patent
Sprogis et al.

(10) Patent No.: US 6,191,825 B1
(45) Date of Patent: Feb. 20, 2001

(54) ELECTRONIC BILLBOARD REPLACEMENT SWITCHING SYSTEM

(75) Inventors: Peter Sprogis, London (GB); Itzhak Wilf, Ramat-Gan (IL); Michael Tamir, Tel-Aviv (IL); Avi Sharir, Ramat Hasharon (IL)

(73) Assignee: Orad Hi-Tech Systems Limited (IL)

( * ) Notice: Under 35 U.S.C. 154(b), the term of this patent shall be extended for 0 days.

(21) Appl. No.: 09/029,777

(22) PCT Filed: Sep. 9, 1996

(86) PCT No.: PCT/GB96/02231

§ 371 Date: Jun. 12, 1998

§ 102(e) Date: Jun. 12, 1998

(87) PCT Pub. No.: WO97/09824

PCT Pub. Date: Mar. 13, 1997

(30) Foreign Application Priority Data

Sep. 8, 1995 (GB) .................................................. 9518431

(51) Int. Cl.[7] .................................................. H04N 5/272

(52) U.S. Cl. ........................... 348/584; 348/589; 348/586

(58) Field of Search .................................... 348/581, 586, 348/584, 578, 589, 585, 588, 590, 591, 592, 598, 705; H04N 5/262, 5/265, 5/272, 5/275, 9/74, 5/75, 9/76

(56) References Cited

U.S. PATENT DOCUMENTS 4,724,491  2/1988  Lambert .

FOREIGN PATENT DOCUMENTS

WO 95/10919  4/1995  (WO) .
WO 95/12282  5/1995  (WO) .

*Primary Examiner*—David E. Harvey
(74) *Attorney, Agent, or Firm*—Fish & Richardson, P.C.

(57) ABSTRACT

An electronic billboard replacement system for use in a TV broadcast system including electronic billboard storage device for storing a plurality of replacement billboards and an electronic sequencer device for controlling the time period that each one of the plurality of billboards is displayed to a TV viewer.

8 Claims, 4 Drawing Sheets

ELECTRONIC BILLBOARD REPLACEMENT SWITCHING SYSTEM

The present invention relates to electronic/virtual billboard replacement switching systems and more particularly to method and apparatus for detecting and controlling the switching of electronic replacement billboards.

In known systems a real billboard present in a stadium can be replaced electronically in a video image by a replacement billboard selected from a plurality of billboards stored in a billboard store. In this manner a viewer at home is able to view a different billboard which may be more relevant to the particular market place in which the viewer resides. The present systems have a number of disadvantages and in particularly are extremely inflexible with respect to billboard changes.

It is an object of the present invention to provide an electronic billboard replacement system which is extremely flexible with respect to billboard changes and which is acceptable both to the viewer and to the broadcaster.

The system according to the present invention allows a billboard to be changed several times during a defined period. The period may be, for example, a half or quarter during a football (soccer or American football) game.

The billboard may be one of a plurality of billboards or may be a complete series of billboards each carrying the same advertisement or message.

In the prior art systems the billboard is changed to one of a plurality of different boards selected from a memory but is maintained constant throughout the entire game or at least each period (quarter or half) of the game.

In the present invention it is proposed to allow switching of a billboard from a first replacement to a second and further replacement, as required at selected time intervals. Thus a first advertisement may be displayed, for example, for five minutes, a second for the next five minutes and so throughout the game.

Selected billboards may be changed at different time intervals dependent on the amount of time paid for by an advertiser. Alternatively, even if a single advertiser sponsors the whole game, the adverts may be changed to display different products or different messages.

A problem which arises from such a flexible system, particularly if there are a large number of boards is that the changing over of the boards will be unacceptable to the broadcaster since it will detract the viewer from the sports event, possibly at a critical time thereby substantially detracting from the enjoyment.

It is therefore a first object of the present invention to provide an electronic billboard switching system in which a replacement billboard can be present for a predetermined period of time.

It is a second object of the present invention to provide an electronic billboard switching system in which a plurality of billboards can be present for individually selected periods of time.

It is a third object of the present invention to provide an electronic billboard switching system in which the switching over from one billboard to the next is not seen by the viewer.

In such a case the system, according to the present invention, monitors the presence of a billboard on a TV picture which is being transmitted. This may be only a single feed or may be more than one if an inset picture is being transmitted. Only when a camera is not transmitting the billboard to be substituted will a change be allowed and thus the viewer will not see a change.

In such cases an advertiser will pay for a billboard to be displayed for a predetermined period, such as five minutes. However, if the billboard remains in view for a further period then the advertiser will have the billboard displayed for that further period which could be substantial. Also, the next advertiser may either not have the full period, particularly if his allocated period is at the end of a game.

It is therefore a further object of the present invention to provide a time recording system for recording the length of the time that the billboard is on display. This time recordal system can in a preferred embodiment record the actual time that a billboard is displayed on the TV outgoing feed and also the length of time that it was potentially on display, i.e. the length of time until the next advertisement is switched in. This recordal can be done for every billboard, thereby giving the advertiser valuable information on the exposure of his product.

The present invention therefore provides an electronic billboard replacement system for use in a TV broadcast system including electronic billboard storage means for storing a plurality of replacement billboards and comprising electronic sequencer means for controlling the time period that each one of said plurality of replacement billboards is displayed to a TV viewer.

The present invention also provides an electronic billboard replacement system including a timer for each billboard, said timer being settable for each said billboard to a desired time period during an event and including means for starting said timer and means for detecting when said desired time period for the billboard has elapsed and including means for detecting the presence of the said billboard on a video image as transmitted to a viewer and means for inhibiting the change over of the said billboard to a next successive billboard whilst the said billboard is visible by the viewer.

The present invention also provides a method of controlling replacement of electronic billboards in a TV broadcast system comprising the steps of:

a. storing in a memory a plurality of replacement billboards;

b. storing in a predetermined sequence in a sequencer a set of billboards selected from said plurality of replacement billboards c. allocating to each billboard in said set a predetermined time period for display;

d. storing in a co-operative manner each predetermined time period with each selected billboard in said set;

e. starting a timer for each billboard;

f. detecting the end of the predetermined time period for the billboard; and g. following detection of the end of the predetermined time period switching from said billboard to the next billboard in the sequence.

Embodiments of the present invention will now be described, by way of example with reference to the accompanying drawings in which.

Figure 1:
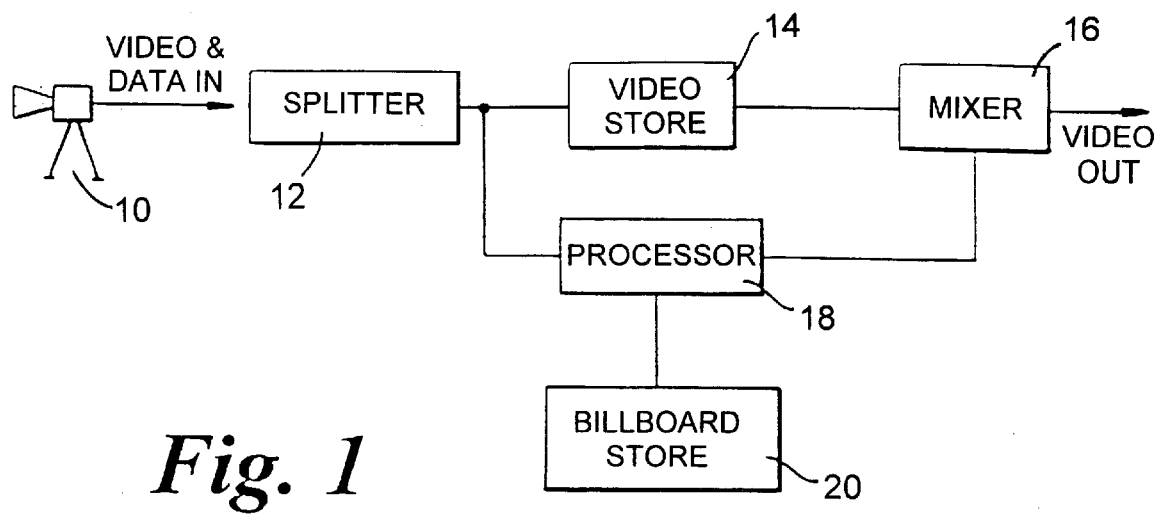
FIG. 1 shows in block diagrammatic form an electronic or virtual billboard replacement system for use in TV broadcasting.

With reference to FIG. 1, an electronic billboard replacement system is shown which replaces a real billboard with a virtual billboard or can position a virtual (i.e. non-existent) billboard in a location where there is no existing billboard.

Electronic systems for replacement of billboards are known from, for example PCT Patent Application No. WO95/10919 to the same applicant the description of which is incorporated herein by reference. Therefore the system of FIG. 1 is shown only schematically and will be described in only outline detail.

The main blocks as shown are a splitter 12 receiving data from a camera 10, which is split into video data stored in store 14 and, after a delay, is fed to a mixer 16 where it is combined with substituted electronic (virtual) billboard generated in a processor/graphics computer 18. The virtual billboards to be electronically substituted are held in a billboard store 20.

Figures 2, 3, 4:
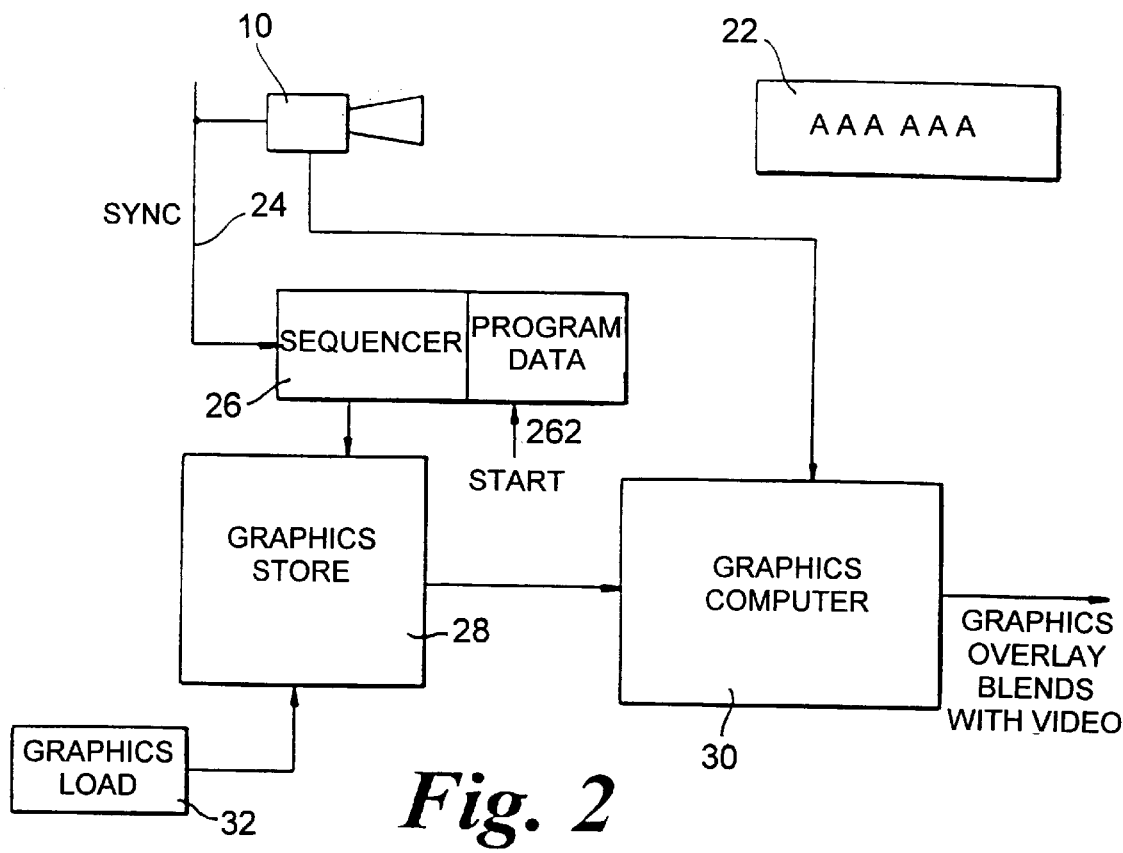
FIG. 2 shows in block diagrammatic form a system according to the present invention for sequential control of electronic or virtual replacement billboards in a single camera system.
FIG. 3 shows a list of stored billboards.
FIG. 4 shows a sequence listing for the virtual billboards as stored in the order shown in FIG. 3.

With reference to FIG. 2, a single camera 10 is shown and it is presumed to be focused onto a billboard 22. A synch signal is supplied to the camera 10 on line 24. To indicate which camera is "on air" at any time an "on air" signal in a multi-camera arrangement is supplied by a switcher as a feedback signal to the camera.

Figure 6:
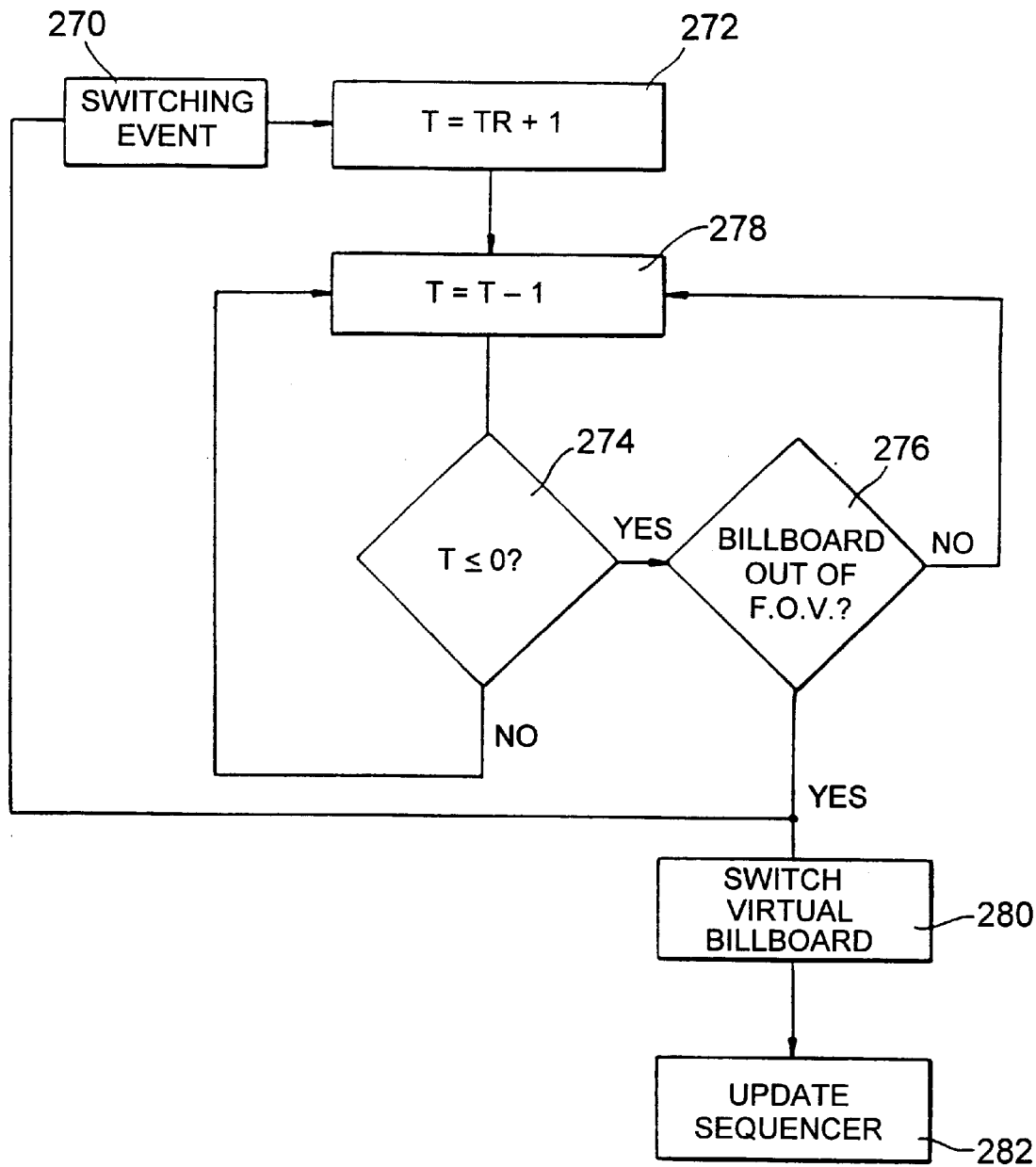
FIG. 6 shows a simplified flow diagram illustrating the inhibition of virtual billboard replacement during a time that the billboard is viewable by a viewer.

The synch line is supplied to a sequencer and timer circuit 26 which contains program sequencing as described hereinafter with reference to FIGS. 3 and 4 and operates also in accordance with the flow diagram of FIG. 6.

The sequencer is connected to the graphics store 28 which stores virtual billboard data in digital format and which can supply such data to a graphics computer 30 under the control of sequencer 26. The graphics stored in graphics store 28 may be altered or supplemented as required by a graphics load system as indicated by block 32.

With reference to FIG. 3, graphics store 28 can store in locations #1 to #N several different billboards shown for distinction as AABB; BBCC: - - - BBDD.

The sequencer 26 includes a memory as shown in FIG. 4 in which the identity of billboards are shown in the sequence in which it is desired to view them. In this example board 1 is shown first followed by boards 2 and then 3 and then board 1 is shown again. The $N^{th}$ board is number 2.

The time for which each board is allocated to be shown is indicated in the right-hand column and this time is preferably input when the sequence order is decided. The time is shown as a number of video frames to ensure an exact changeover should this be possible. Thus, again by way of example, billboard No. 1)=AABB) will be shown for 10,000 frames, No. 2 for 12,000 frames, etc.

Figure 5:
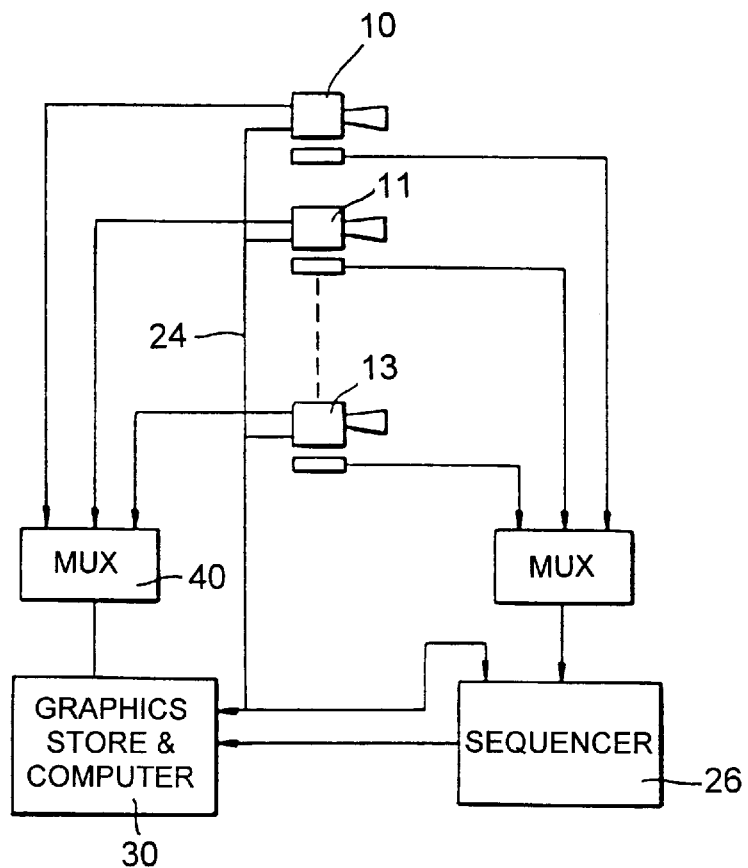
FIG. 5 shows diagrammatically an arrangement according to the present invention having a plurality of cameras.

Each billboard 22 can be provided with an individual sequence and thus through the invention will be described with reference to one billboard, a plurality of billboards could be accommodated with the same or different sequences, each sequence being stored in the sequencer and program data store 26. If more than one camera is used then the cameras may be arranged as shown in FIG. 5. A plurality of cameras 10, 11–13 are shown and each is connected to a multiplexer 40, which multiplexes the video output of each camera to the graphics store and computer 30 which is shown as an integral unit. A further multiplexer 42 may be used to multiplex camera orientation information to provide an indication if a billboard is viewable by a viewer.

The operation of the sequencer is explained with reference to FIGS. 2 and 6. The sequence program is started either automatically, for example by detection of a first billboard or manually as indicated by input (262). Each virtual billboard, as explained is allocated a time for display. The sequence in FIG. 6 may either commence at the start or when a billboard is switched (270).

From the time stored in the program of FIG. 4 a time out counter (272) is set to the programmed time TR (which for program 1=10,000 frames). The program is then continually run at intervals which are so short that several cameras and billboards can be interrogated in a single video frame time period.

Until time TR has been exceeded for any billboard the sequencer will cycle. Once T≦0 (274) the program will test (276) to see if the virtual billboard (e.g. No. 1) is in or out of the field of view (FOV) of the camera in FIG. 2 (or the camera being multiplexed in FIG. 5). If NO then the sequence will recycle until the billboard is out of the FOV. When this occurs the instruction will be given to switch the virtual billboard (280) to the next programmed billboard (i.e. No. 2 in FIG. 4). This switching event resets the time out counter and updates the sequencer (282).

The time on the time out counter can be recorded so that if a billboard remains in view for substantially longer than its allocated TR, this can be noted and an additional charge made to the advertiser.

Figure 7:
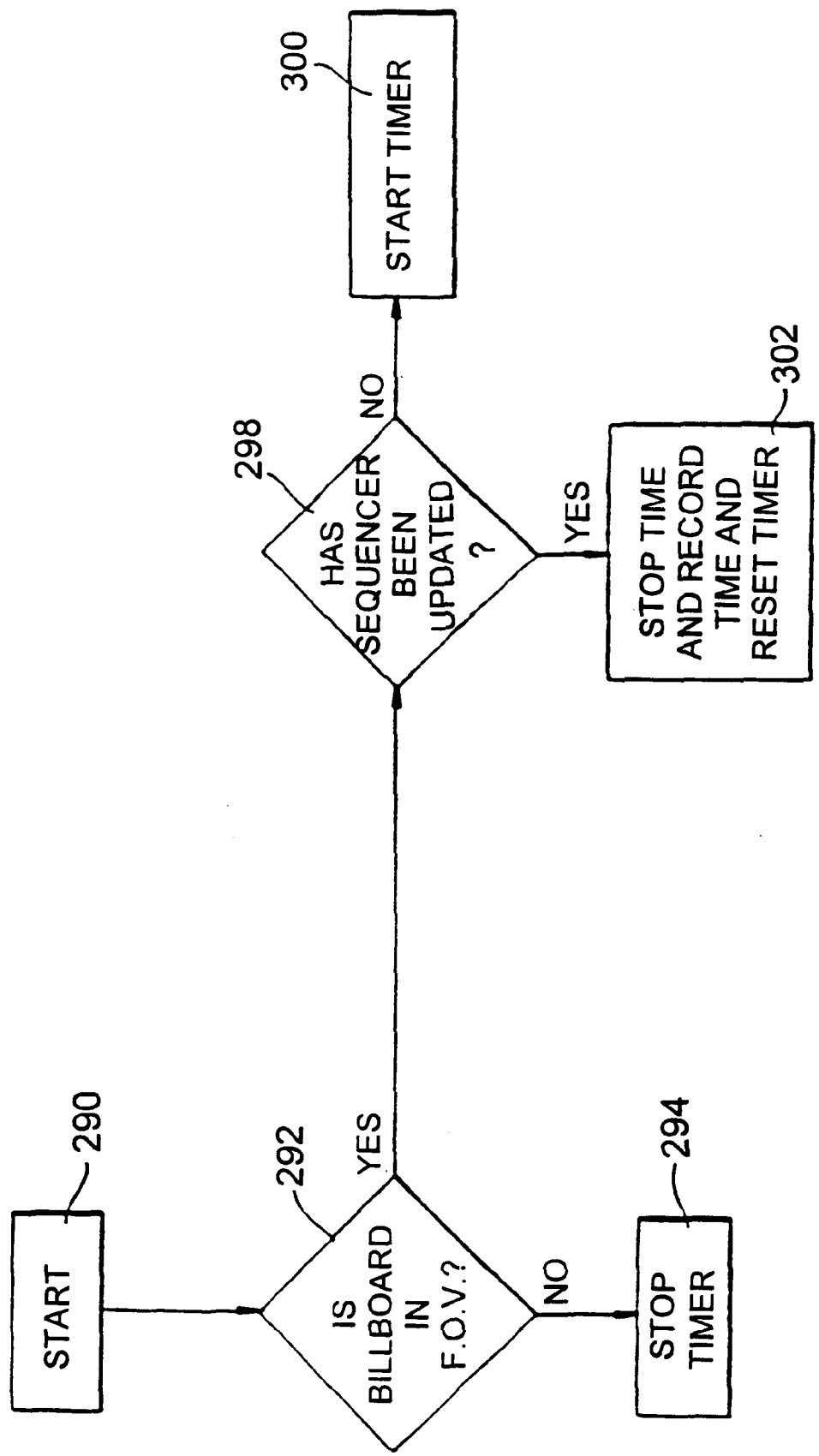
FIG. 7 shows a simplified flow diagram illustrating the calculation of the time for which a billboard is viewable by a viewer.

With reference to FIG. 7, the time for which any virtual billboard is actually viewable by a viewer may be automatically calculated since the system knows when a billboard is in the FOV. From a start action (290) which may be triggered by sequence update, the program interrogates the camera data to ascertain if the billboard is in the FOV (292). If it is not then a billboard timer is stopped or not started (294). The program questions if the sequencer has been updated (298). If not then the billboard presence timer is started (or restarted) (300). If the sequencer updates then the billboard timer is stopped, the time recorded and the timer is reset (302).

The present invention ensures that billboards may be changed several times during a sports event but without intrusion on the event. Also the system has flexibility enabling the actual time during which each billboard is viewable to be recorded for later use.

What is claimed is:

1. An electronic billboard replacement system for use in a TV broadcast system including electronic billboard storage for storing a plurality of replacement billboards, an electronic sequencer for controlling the time period that each one of said plurality of replacement billboards is displayed to a TV viewer, a timer for each billboard, said timer being settable for each said billboard to a desired time period during an event and including means for starting said timer and means for detecting when said desired time period for the billboard has elapsed and including means for detecting the presence of said billboard on a video image as transmitted to a viewer, and detection means connected to a field of view detector and to said timer, said detection means providing an output signal inhibiting changeover of said billboard to a next successive billboard while said billboard is visible to the viewer.

2. An electronic billboard replacement system as claimed in claim 1 in which said timer is operative to record the time during which each said billboard is viewable.

3. An electronic billboard replacement system as claimed in claim 1, including a second timer operable to record the time during which a said billboard is actually displayed to a viewer.

4. An electronic billboard replacement system for use in a TV broadcast system including electronic billboard storage for storing a plurality of billboards, means for changing a first replacement billboard to a second replacement billboard, means for detecting a billboard being displayed to a viewer, and detection means connected to a field of view detector, said detection means providing an output signal inhibiting changeover of the first replacement billboard to the second replacement billboard when said first replacement billboard is visible to the viewer.

5. A method of controlling replacement of electronic billboards in a TV broadcast system comprising the steps of:
   a. storing in a memory a plurality of replacement billboards;
   b. storing in a predetermined sequence in a sequencer a set of billboards selected from said plurality of replacement billboards;
   c. allocating to each billboard in said set a predetermined time period for display;
   d. storing in a co-operative manner each predetermined time period with each selected billboard in said set;
   d. starting a timer for each billboard;
   f. detecting an end of the predetermined time period for the billboard;
   g. following detection of the end of the predetermined time period switching from said billboard to a next billboard in the sequence;
   h. monitoring visibility of each billboard to a viewer, and
   i. inhibiting any changeover of any said billboard which is visible by a viewer.

6. An electronic billboard replacement system for use in a TV broadcast system including
   electronic billboard storage for storing a plurality of replacement billboards,
   an electronic sequencer for controlling the time period that each one of said plurality of replacement billboards is displayed to a TV viewer, said electronic sequencer being programmable to select identical or selectively different time periods for each of said plurality of replacement billboards,
   a timer for each billboard, said timer being settable for each said billboard to a desired time period during an event and including means for starting said timer and means for detecting when said desired time period for the billboard has elapsed and including means for detecting the presence of said billboard on a video image as transmitted to a viewer, and
   detection means connected to a field of view detector and to said timer, said detection means providing an output signal inhibiting changeover of said billboard to a next successive billboard while said billboard is visible to the viewer.

7. An electronic billboard replacement system as claimed in claim 6 in which said timer is operative to record the time during which each said billboard is viewable.

8. An electronic billboard replacement system as claimed in claim 6 including a second timer operable to record the time during which a said billboard is actually displayed to a viewer.

* * * * *